United States Patent
Connelly

[11] 3,898,838
[45] Aug. 12, 1975

[54] ULTRASONIC SCANNING SYSTEM
[75] Inventor: John J. Connelly, Chicago, Ill.
[73] Assignee: International Harvester Company, Chicago, Ill.
[22] Filed: Nov. 1, 1973
[21] Appl. No.: 411,942

[52] U.S. Cl. ............... 73/67.8 S; 318/568; 318/578
[51] Int. Cl.² ......................................... G01N 29/04
[58] Field of Search ........... 73/67.8 S, 67.9, 67.5 R, 73/67.6, 67.7, 67.8 R, 71.5 US; 318/568, 574, 575, 578

[56] References Cited
UNITED STATES PATENTS
| | | |
|---|---|---|
| 3,678,736 | 7/1972 | May.................................. 73/67.8 S |
| 3,721,118 | 3/1973 | Jeffras .............................. 73/67.8 S |
| 3,727,119 | 4/1973 | Stanley et al. ..................... 318/568 |
| 3,757,187 | 9/1973 | Arai................................. 318/568 |

Primary Examiner—Richard C. Queisser
Assistant Examiner—Stephen A. Kreitman
Attorney, Agent, or Firm—Frederick J. Krubel; Floyd B. Harman

[57] ABSTRACT

Ultrasonic scanning system in which the angular position of a transducer is alternately adjusted about two transverse axes by reversible stepping motors each being adjusted by operating in one direction until obtaining a decrease in the amplitude of a front surface reflection signals, gated to a sample/hold circuit, the direction being reversed to increase the amplitude of the front surface reflection signal to a maximum and to thereby position the axis of the transducer normal to the front surface of a part under test. Another stepping motor is operated to hold a transducer toward or away from the part in response to outputs from sample/hold circuits to which a received video signal is gated during time intervals respectively greater than and less than a time corresponding to a desired spacing, to thereby maintain a substantially fixed distance between a transducer and the part.

14 Claims, 5 Drawing Figures

3,898,838

ULTRASONIC SCANNING SYSTEM

BACKGROUND OF THE INVENTION

1. Field of the Invention

This invention relates to an ultrasonic scanning system and more particularly to a pulse-echo system in which a transducer is moved along in spaced relation to the surface of a part to detect inhomogeneities in the part. With the system of this invention ultrasonic energy is transmitted into the front surface of a part and received therefrom wth a high degree of uniformity and reliability, even with irregularly shaped parts.

2. Background of the Prior Art

Ultrasonic scanning systems have heretofore been provided in which a transducer is moved along in spaced relation to the front surface of a part, transmitting bursts of ultrasonic energy through a liquid couplet toward the front surface and developing a video signal from reflections from the front and back surfaces of the part and from inhomogeneities within the part. The indications obtained with prior systems have not always been reliable due to variations in the spacing between the transducer and the front surface and due to variations in the angle at which the ultrasonic energy is directed into and received from the front surface of the part. Especially difficult problems are presented when the contour of the part is irregular and also in systems in which the amplitudes of reflected signals are analyzed to determine the character of the part. In one type of system, for example, the amplitudes of echo signals from a plurality of contiguous depth ranges within the part are analyzed to grade the part according to the cumulative effect of non-metallic inclusions or other inhomogeneities in the part. A particular part may not contain any large flaws sufficient to render the part unsatisfactory for its intended use but the part may nevertheless be unsatisfactory if there are a large number of relatively smaller sized flaws therein. For satisfactory operation of this type of system, it is essential that the transmission of energy into the surface of the part and the reception of energy from the surface of the part be as uniform as possible in order that the amplitudes of the signals may be properly analyzed.

Systems have been provided wherein the movement and positioning of a transducer is controlled from a computer, programmed according to the shape of the part. However, with irregularly shaped parts having complex contours, the development of an accurate program is difficult, time-consuming and expensive.

SUMMARY OF THE INVENTION

This invention was evolved with the general object of overcoming the disadvantages of prior systems and providing a system in which the ultrasonic energy is transmitted into and received from a part with a high degree of uniformity and reliability. According to an important feature of the invention, the angular position of a transducer is adjusted by means of at least one reversible motor. Preferably, two motors are provided operative to adjust the angular position of the transducer about two axes in generally transverse relation to each other and each motor is of a stepping type, operative to move the transducer through a predetermined small angle in response to application of each pulse thereto. Each motor is automatically adjusted to maximize the amplitude of a front surface reflection signal in a manner such as to position the transducer axis substantially normal to the portion of the front surface of the part which is impinged by the beam of ultrasonic energy from the transducer. With this arrangement, the transmission of energy into and from the part is uniform and highly reliable results are obtained.

Specific features relate to the provision and use of a sample/hold circuit to which front surface reflection signals are gated. One angular position control motor is stepped in an arbitrary direction and the resulting "new" output of the sample/hold circuit is compared with the prior output of the sample/hold circuit. If the new output is greater than the prior output, the motor is stepped in the same direction, such operation being continued until a new output is obtained which is less than the next prior output, whereupon the stepping motor is stepped one step in the reverse direction. Preferably, the two angular position control motors are adjusted alternately, the same sample/hold circuit being used for adjustment of both.

Another very important feature relates to the automatic adjustment of the spacing between the transducer and the front surface of the part to obtain a substantially uniform spacing and a uniform transmission path through the water or other couplant used to transmit energy between the transducer and the front surface of the part. Preferably, the video signal is gated to first and second sample/hold circuits, the front surface reflection signal being gated to the first sample/hold circuit when the spacing between the transducer and the part is less than the desired spacing and being gated to the second sample/hold circuit when the spacing between the transducer and the part is greater than the desired spacing. In response to a predetermined output from the first sample/hold circuit, a motor is energized in one direction to move the transducer away from the part and in response to an output from the second sample/hold circuit, the motor is energized in the reverse direction to move the transducer toward the part.

Additional important features relate to the circuitry for establishing the gating time intervals to the circuitry of the sample/hold circuits and to circuits for controlling the stepping motors from the outputs of the sample/hold circuits.

This invention contemplates other objects, features and advantages which will become more fully apparent from the following detailed description taken in conjunction with the accompanying drawings.

Figure 1:
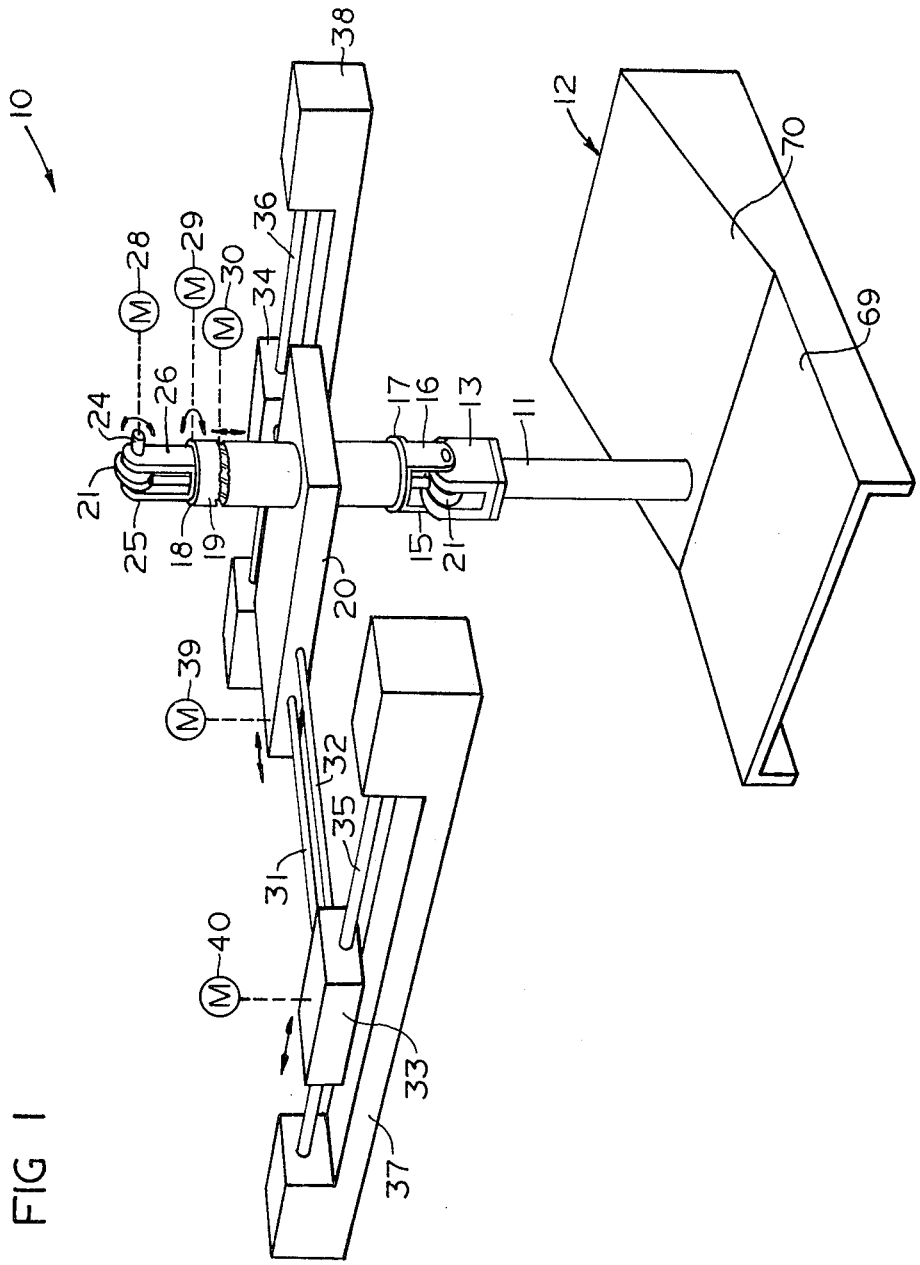
FIG. 1 is a perspective view diagrammatically illustrating apparatus of an ultrasonic scanning system according to the invention, including motors for controlling the movement, positioning and angular orientation of a transducer.

Reference numeral 10 generally designates apparatus of an ultrasonic scanning system according to the invention. The apparatus 10 comprises a search tube 11 having a transducer in the end thereof for transmitting pulses of ultrasonic energy into a part 12 and for receiving reflections of ultrasonic energy from the surface of the part 12 and from inhomogeneities within the part 12. A suitable liquid coupling medium is provided between the part and the transducer in the end of the search tube 11, either by operating with the part 12 and the end portion of the search tube 11 immersed in water or another or by providing a jet coupling device, not shown on the end of the search tube 11.

The search tube 11 is carried by support means which permits controllable rotation of the search tube 11 about a horizontal pivot axis and about a vertical pivot axis intersecting the horizontal pivot axis and also permits control of the position of the intersection of the horizontal and vertical axes of a vertical $y$ direction and $x$ and $z$ horizontal directions. Such support means are known in the art, a simplified version of one type being illustrated diagrammatically in FIG. 1. As shown, a gimbal arrangement is provided in which the search tube 11 is carried by a generally U-shaped support 13 which is journalled for pivotal movement about a gimbal axis on a pin 14 extending between a pair of spaced legs 15 and 16 depending from a ring 17. Ring 17 is secured to the lower end of an inner tubular member 18 disposed within an outer tubular member 19 which is supported from a member 20. An endless belt 21 is entrained about and secured at one point to a cylindrical member which is secured between the legs of the U-shaped member 13 and extends through the inner tubular member 18. The upper end of the belt 21 is entrained about a pulley member 22 on a on a shaft 24 which is journalled by a pair of members 25 and 26 secured to the upper ends of the inner tubular member 18. By rotating the shaft 24, the search tube 11 is pivoted about the axis of the pin 14.

As also illustrated diagrammatically, the shaft 24 is controllably rotated by means of a reversible stepping motor 28 and the inner tubular member 18 is controllably rotated about its vertical swivel axis by another stepping motor 29. The outer tubular member 19 is not rotatable relative to the member 20 but is movable vertically relative thereto, in the $y$ direction, by means of a third stepping motor 30. Member 20 is supported for horizontal movement in the $x$ direction along a pair of parallel support shafts 31 and 32 having opposite ends supported by a pair of blocks 33 and 34 movable in the $z$ direction along a pair of parallel support shafts 35 and 36 carried by a fixed support 37 and a fixed support 38. A stepping motor 39 controls movement of the member 20 along shafts 31 and 32 while a stepping motor 40 controls movement of the blocks 33 and 34 along the shafts 35 and 36.

Accordingly, stepping motor 28 controls the angular position of axis of the search tube 11 about the gimbal axis of pin 14, stepping motor 29 controls the angular position of the search tube 11 about the vertical swivel axis of tubular member 18 and stepping motors 30, 39 and 40 respectively control the position of the intersection of the gimbal and swivel axes in the vertical $y$ direction, the horizontal $x$ direction and the horizontal $z$ direction.

Figure 2:
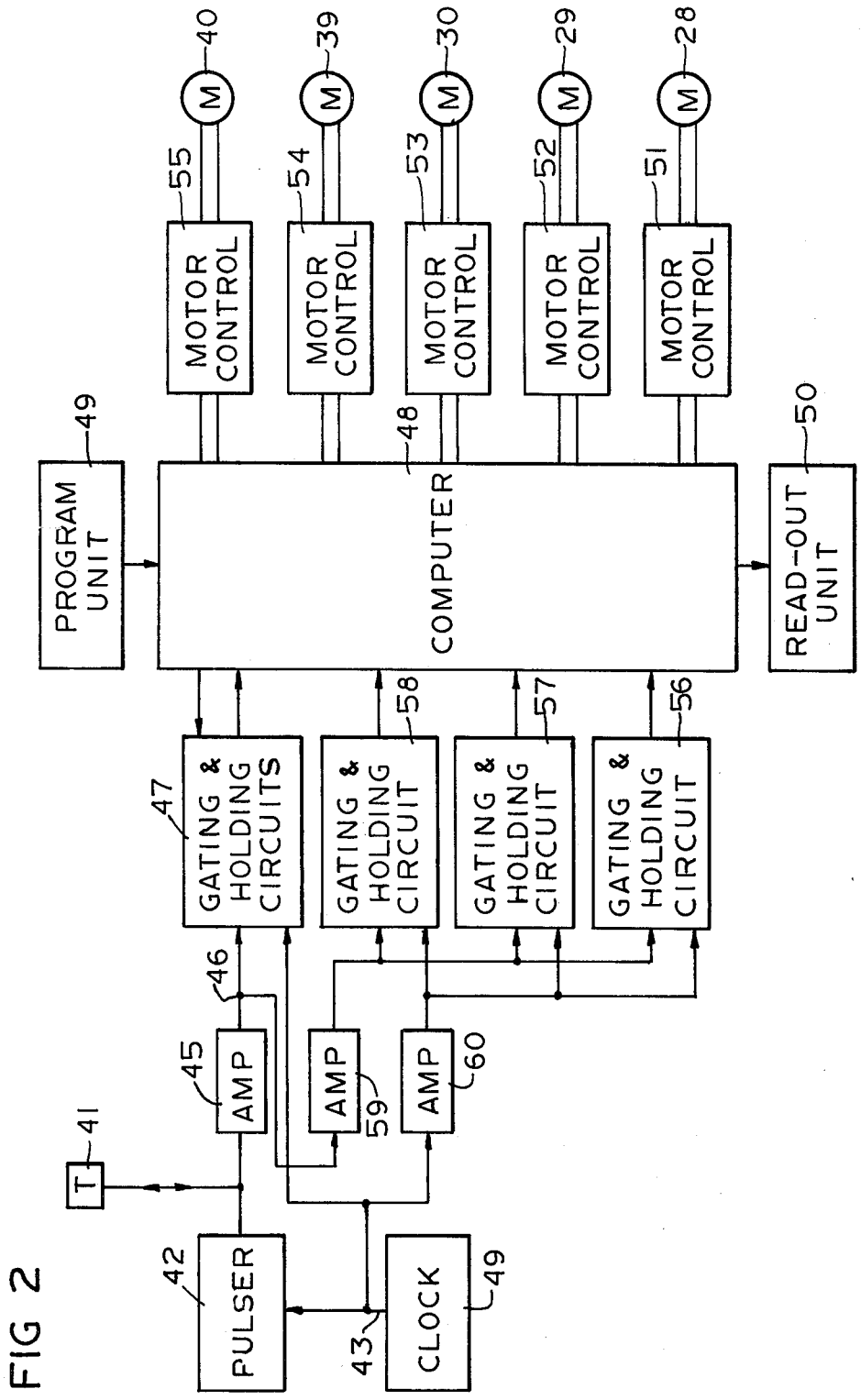
FIG. 2 is a schematic block diagram illustrating circuitry for energizing the transducer and for controlling the motors of the apparatus shown in FIG. 1.

FIG. 2 is a schematic block diagram of electrical circuitries of the ultrasonic scanning system of this invention. A transducer 41, located in the end of the search tube 11, is connected to the output of a pulser 42 to which a clock signal is applied periodically through a line 43 from a clock circuit 44, bursts of ultrasonic energy being thereby transmitted into the part 12 under test. Echo signals developed by the transducer 41 are applied through an amplifier 45 to develop a video signal on a line 46. Line 46 is connected to the input of a gating and holding circuit 47 which develops signals which are applied to a computer 48.

Computer 48 is controlled by a program unit 49 and develops output signals applied to a read-out unit 50. The computer 48 also controls the gating and holding circuits 47 and in addition applies signals to motor control units 51–55 respectively connected to the gimbal motor 28, the swivel motor 29, the $y$ control motor 30, the $x$ control motor 39 and the $z$ control motor 40.

In operation, the computer 48 may be programmed to so control the motors 28–30, 39 and 40 as to effect scanning of a part, the video signals developed on line 46 and processed through the gating and holding circuits 47 being applied to analog-digital conversion circuits in the computer 48 and being entered into memory circuits therein. By way of example, the gating and holding circuits 47 may include a plurality of gates operative to apply video signals to a plurality of holding circuits corresponding to reception of echoes from a plurality of contiguous depth ranges under control of the program unit 49, the computer may feed information to the read-out unit so as to the location and size of any flaws in the part having a size above a predetermined value. Also, the computer may be programmed to grade the part accordingly to the cumulative effect of non-metallic inclusions or other inhomogeneities in the part. A particular part may not contain any large flaws sufficient by themselves to render the part unsatisfactory for its intended use but the part may nevertheless be unsatisfactory if there are a large number of smaller sized inclusions or inhomogeneities therein.

To obtain optimum results, the transducer axis should be normal to the surface portion of the part into which the beam of ultrasonic energy is transmitted and from which echoes are received. Also, it is important that there be a uniform spacing between the transducer and the surface of the part. If the exact configuration and placement of the part is known, the computer may be programmed to so control the motor as to obtain optimum orientation of the search tube 11 with respect to the gimbal and swivel axes and optimum positioning of the intersection of such axes relative to the part. In general, however, only the approximate configuration and placement of the part will be known and it is not possible to obtain optimum results from programming alone. In addition, if the part under test has an irregular shape and complex contours, the exact programming may be very difficult and time consuming even if the exact shape might be known or ascertainable.

An important feature of this invention is in the provision of means for effecting automatic adjustment of the angular position of the search tube 11 during scanning of the part to position the axis of the search tube 11 in a direction normal to the surface portion of the part into which the beam of ultrasonic energy is transmitted. Another important feature is in the provision of means for effecting automatic adjustment of the spacing between the transducer and the surface portion of the part into which the ultrasonic energy is transmitted.

In accordance with the invention, three gating and holding circuits 56, 57 and 58 are provided to which video and clock signals are applied through the amplifier circuits 59 and 60. Each of the circuits 57, 58 and 59 is operative to sample the video signals during a predetermined gating time period and to develop an output signal corresponding to the amplitude of the video signal during the predetermined gating time period. Such output signals are applied to the computer 48 which is programmed by the program unit 49 to control the signals applied to the motor control units 51–53 in a manner such as to effect automatic adjustment of the angular position of the search tube 11 and also to automatically adjust the distance between the transducer and the adjacent surface portion of the part.

Figures 3, 4:
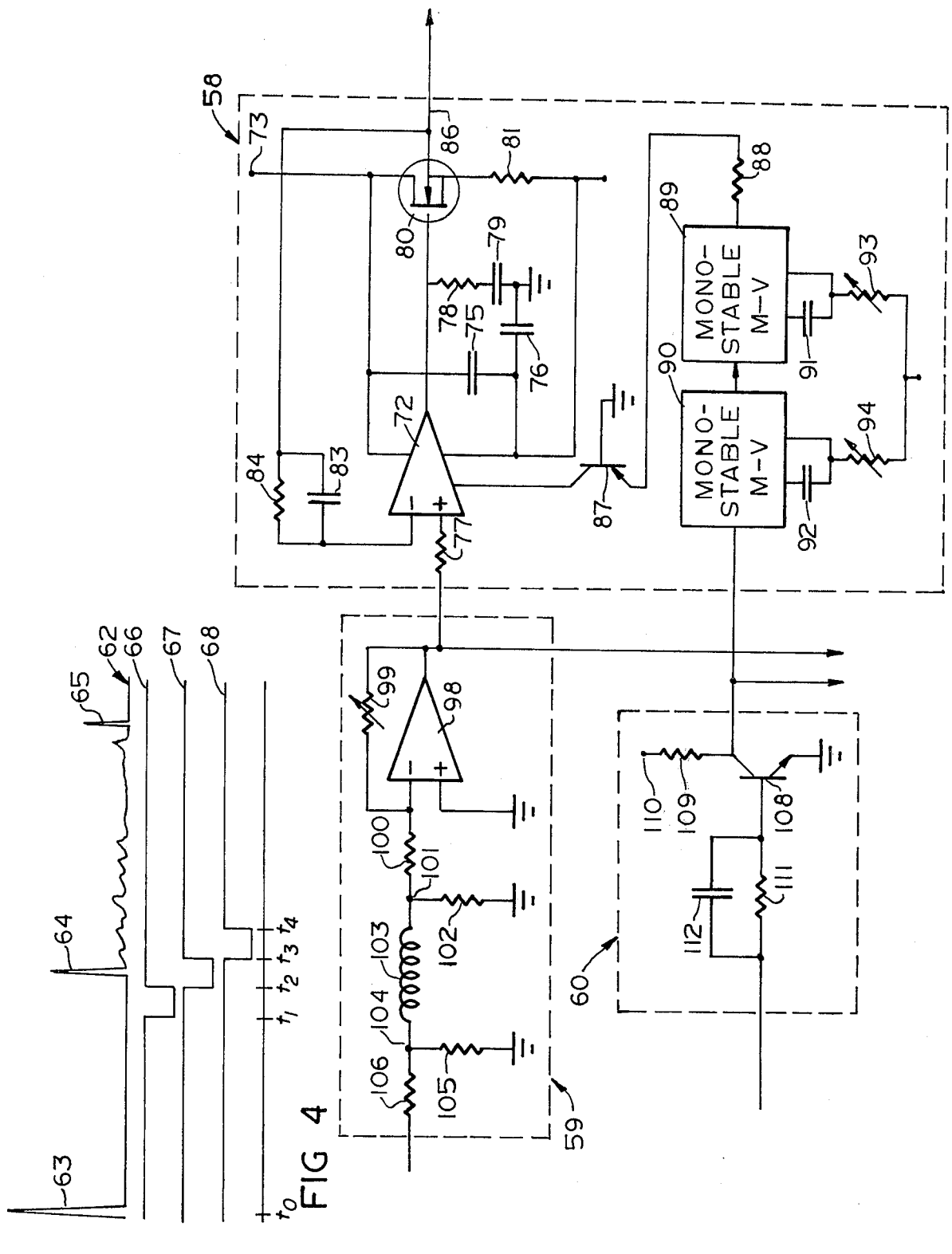
FIG. 3 is a view showing typical wave forms produced at certain points of the circuit shown in FIG. 2.
FIG. 4 is a circuit diagram of a video and clock amplifier circuit and one gating and holding circuit of the system shown in clock form in FIG. 2.

The basic mode of operation will be clarified by reference to FIG. 3 wherein reference numeral 62 designates the wave form of a typical vido signal produced at the output line 46 of amplifier 45, including a high amplitude "main bang" pulse 63 produced at a time $t_0$, by pulsing of the transducer 41, another high amplitude pulse 64 produced by the transducer 41 in response to an echo from the front surface of the part and a third pulse 65 of lesser amplitude produced in response to an echo from the back surface of the part. As indicated, the wave form may include additional pulses between the front and back surface pulses 64 and 65, from flaws or inhomogeneities in the part.

Reference numeral 66 indicates the form of a gating signal used in the gating and holding circuit 56, permitting sampling of the video signal from a time $t_1$ to a time $t_2$. Reference numeral 67 indicates the form of a gating signal used in the gating and holding circuit 57, permitting sampling of the video signal from time $t_2$ to a time $t_3$ and reference numeral 68 indicates the form of a gating signal used in the gating and holding circuit 58, permitting sampling of the video signal from time $t_3$ to a time $t_4$. Gating signal 67 is used for the purpose of maintaining the axis of the transducer normal to the front surface of the part while gating signals 66 and 68 are used for the purpose of maintaining a fixed distance between the transducer and the front surface of the part.

In the timing of signals as indicated in FIG. 3, the front surface pulse 64 occurs during the gating time interval $t_2$–$t_3$, after the gating time interval of $t_1$–$t_2$ and before the gating time interval $t_3$–$t_4$. With such timing of the signals, an output signal is developed only by the gating and holding circuit 57 which is used for the purpose of controlling the angular position motor control circuits 51 and 52.

In particular, the computer 48 is programmed to periodically perform an adjustment operation in which the angular position of the search tube 11 is adjusted about the gimbal axis, i.e. the axis of the pin 14. In each such adjustment operation, a pulse is applied from the pulser 42 to the transducer 41 and the resulting output of the gating and holding circuit 57 is applied to analog-digital circuits in the computer and registered in storage circuits of the computer. Prior to the next pulse from the pulser 42, a pulse is applied from the computer 48 to the motor control unit 51 to apply a stepping pulse to the stepping motor 28 to cause the stepping motor 28 to take one step in an arbitrary direction. Then, following the next pulse applied from the pulser 42 to the transducer 41, the new output of the gating and holding circuit 57 is applied to the analog-digital converter circuits in the computer 48 to be registered in the memory therein. The computer is programmed to compare the registered new output with the previously registered output. If the new output is greater, a signal is applied to the motor control unit 51 to apply a stepping pulse to the motor 28 and to cause the motor to take one step in the same direction as in the previous cycle. If the new output is less than the previously registered output, the motor 28 is caused to take one step in the opposite direction. This operation is carried out through a substantial number of pulsing cycles, causing angular positioning of the search tube relative to the gimbal axis such as to develop substantially a maximum signal during the time interval from $t_2$ to $t_3$.

The computer 48 is also programmed to periodically perform an adjustment operation in which the angular position of the search tube 11 is adjusted about the vertical swivel axis. In this case, the operation is the same as in the adjustment about the gimbal axis, except that the stepping pulses are applied to the motor control unit 52 for the motor 29, rather than to the motor control unit 51 for the motor 28. After adjustment of the position relative to both the gimbal and swivel axes, the search tube 11 is then positioned to develop a substantially maximum signal during the time interval from $t_2$ to $t_3$, the axis of the search tube and the transducer being thus normal to the front surface portion of the part impinged by the ultrasonic beam.

Such periodic adjustment of the position of the transducer axis with respect to the gimbal and swivel axes is performed at intervals frequent enough to allow following of bends, curves and undulations in a surface of a part during a scanning operation. For example, in scanning a part 12 having a shape as depicted in FIG. 1 with a horizontal surface portion 69 having a right-hand edge adjacent the lower left-hand edge of an upwardly inclined surface portion 70, if the scanning is being performed by moving to the right in the $x$ direction under control of the motor 39, the periodic adjustment operation will maintain the axis of the search tube 11 in a substantially vertical position when the horizontal surface portion 69 is being scanned. When the search tube moves to a point over the junction of the right-hand edge of the surface ortion 69 and the left-hand edge of the surface portion 70, the automatic adjustment operation will swing the transducer axis in a counter-clockwise direction to be normal to the surface p tion 70. Continued periodic adjustment opereatins wi then maintain the transducer axis normal to the surface portion 70 as the scanning continues to the right.

As above indicated, the gating signals 66 and 68 are used for the purpose of maintaining a fixed distance between the transducer 41 and the front surface of the part. If during scanning the transducer should move closer to the front surface of the part, the front surface pulse 64 will occur during the time interval $t_1$–$t_2$ of gating signal 66 and the gating and holding circuit 56 will produce an output signal applied to analog-digital conversion circuits in the computer 48 to be registered in the memory thereof. The computer 48 then applies a signal to the motor control unit 53 to step the motor 30 in a direction such as to move the tubular member 19 upwardly to thereby move the transducer upwardly away from the front surface of the part. If during scanning, the transducer should move away from the surface of the part, the front surface pulse 64 will occur during the time interval $t_3$–$t_4$ of gating signal 68 and the gating and holding circuit 58 will produce an output signal applied to analog-digital conversion circuits in the computer to be registered in the memory thereof. The computer 48 then applies a signal to the motor control unit 53 to step the motor 30 in a direction such as to move the tubular member 19 downwardly to thereby move the transducer downwardly toward the front surface of the part.

The system thus maintains a substantially fixed distance between the transducer and the front surface of the part and insures that the front surface pulse will occur during the time interval $t_{2-t3}$ of gating signal 65 to thereby insure proper automatic adjustment of the transducer axis. It is noted that in the timing diagrams of FIG. 3, the beginning of the gating pulse wave form 67 is coincident with the end of the gating pulse wave form 66, at time $t_2$, while the end of the gating pulse of wave form 67 is coincident with the beginning of the gating pulse of wave form 68, at time $t_3$. However, exact coincidence is not necessarily required and the beginnings and ends may occur before or after the ends and beginnings of the prior and subsequent timing signals.

It is also noted that the discussion of the automatic spacing operation assumes that a generally horizontal surface is being scanned. In scanning a generally vertical surface, with the axis of the transducer generally horizontal, the computer may apply the adjustment signals to either the motor 39 or the motor 40, depending upon the orientation of the scanned surface. It is also possible to program the computer to apply stepping pulses simultaneously to two or even all three of the stepping motors, as when scanning a surface at a generally 45° angle to two or all three of the coordinate axes.

It is important to note that with the automatic control of angulation and spacing obtained with this invention, the computer can be programmed according to the general overall shape and dimensions of the part under test and exact programming is not required. It is not necessary to determine the exact shape and contours of the part and programming of the computer is greatly simplified. Also, the invention is not limited to systems employing computers that may, for example, be used where there is a manual setup of the general scanning operation. FIG. 4 is a circuit diagram of the video and clock signal amplifiers 59 and 60 and the gating and holding circuit 58, circuits of the other two gating and holding circuits 56 and 57 being substantially the same as that of the gating and holding circuit 58.

Thee gating and holding circuit 58 comprises a differential amplifier 72 having terminal connected to positive and negative power supply terminals 73 and 74, a by-pass capacitor 75 being connected between the terminals 73 and 74 and a by-pass capacitor 76 being connected between terminal 74 and ground. A plus input of amplifier 72 is connected through a resistor 77 to the output of the video amplifier 59 and the output of the amplifier 72 is connected through a resistor 78 and a capacitor 79 to ground and directly to the input of a solid state device 80 having a terminal connected to the power supply terminal 73. An output terminal of device 80 is connected through a resistor 81 to the terminal 74, through the parallel combination of a capacitor 83 and a resistor 84 to the minus input of amplifier 72 and directly to a line 86 connected to the computer 48.

The amplifier 72 has a control terminal connected to the collector of a transistor 87 having a grounded base and having an emitter connected through a resistor 88 to the output of a monostable multivibrator 89 the input of which is connected to the output of a second monostable multivibrator 90 the input of which is connected to the output of the clock signal amplifier 60. Multivibrators 89 and 90 have pairs of terminals connected to capacitors 91 and 92 terminals of which are connected through adjustable resistors 93 and 94 to a power supply terminal 95. Multivibrators 89 and 90 may preferably be in the form of integrated circuits of a type which are commercially available.

In operation, the resistor 94 is adjusted to obtain a delay by the multivibrator 90 corresponding to the time interval $t_{0-t3}$ while resistor 93 is adjusted to obtain a delay by multivibrator 89 determining the time interval $t_{3-t4}$. During the time interval $t_{3-t4}$, multivibrator 89 applies a signal through transistor 87 to render the amplifier 72 operative. In response to a pulse then applied from the video amplifier 59 through resistor 77, the capacitor 79 is charged to a voltage proportional thereto, a corresponding voltage being developed at the output line 86. Capacitor 83 and resistor 84 provide inverse feedback to fix the voltage at the output line 86 at a value substantially equal to the peak of the input pulse. After the end of the gating time interval and until the beginning of the next gating time interval, the differential amplifier 72 is inoperative and the voltage level at the output line 86 is held at substantially the level sent during the gating time interval, the device 80 having a very high input impedance. During the gating time interval of the next cycle, the level at the output line 86 is increased or decreased in response to an increase or decrease in the peak amplitude of the video signal.

The illustrated video signal amplifier 59 comprises an amplifier 98 having an output connected to the inputs of the gating and holding circuits 56–58. A plus input of amplifier 98 is grounded while the minus input thereof is connected through an adjustable resistor 90 to the output thereof and through a resistor 100 to a circuit point 101 which is connected through a resistor 102 to ground and through an inductor 103 to a circuit point 104, circuit point 104 being connected through a resistor 105 to ground and through a resistor 106 to the output of the video amplifier 45.

The illustrated clock signal amplifier 60 comprises a transistor 108 having a grounded emitter, a collector connected to the gating and holding circuits 56–58 and through a resistor 109 to a power supply terminal 100 and a base connected through a resistor 111 and a parallel capacitor 112 to the clock circuit 44.

Figure 5:
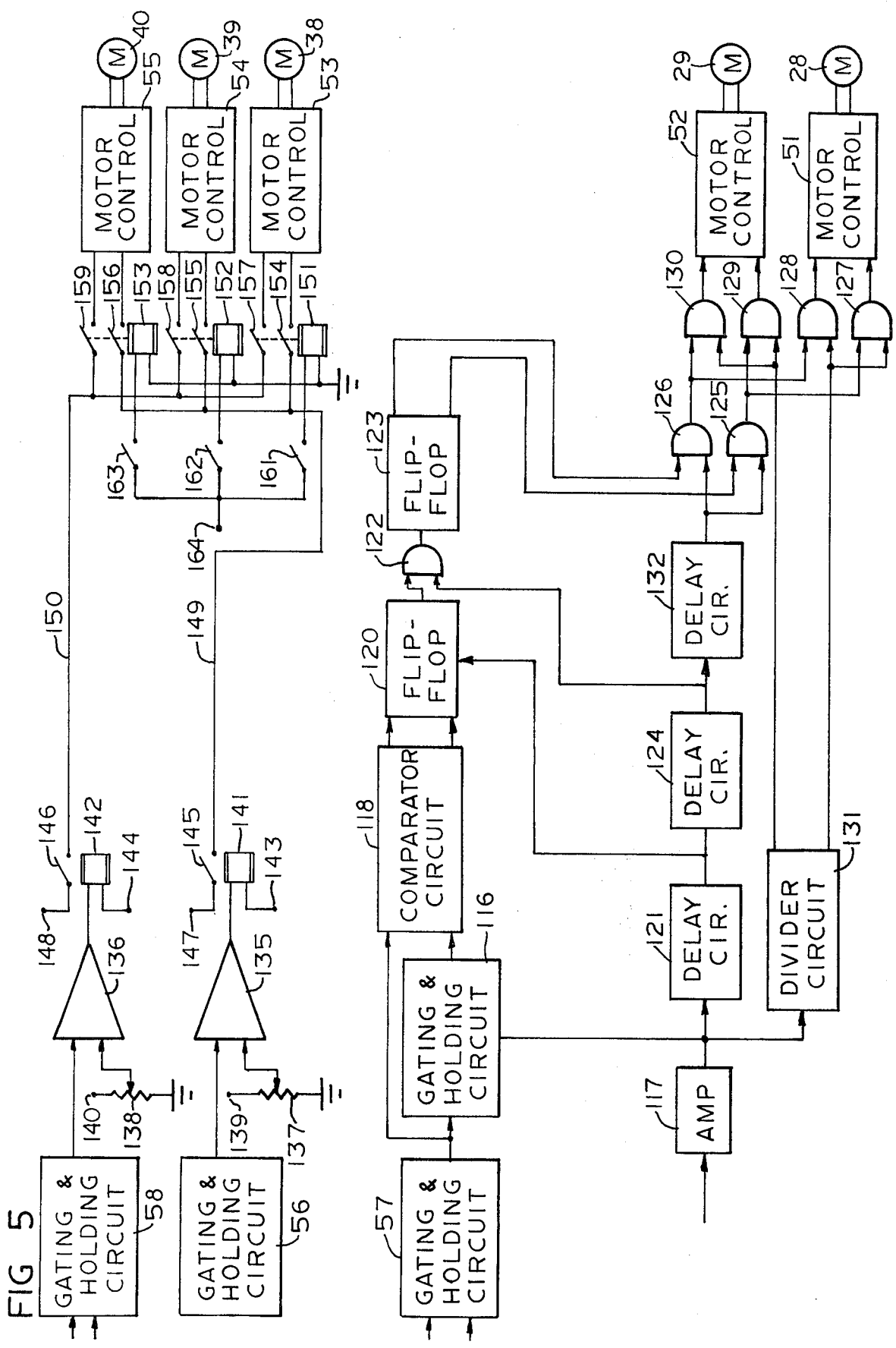
FIG. 5 is a circuit diagram showing logic circuitry which may be incorporated in or used in place of portions of a computer shown in block form in FIG. 2.

FIG. 5 illustrates logic circuitry forming means equivalent to the computer 48 and associated programming means for performing the functions described above in control of spacing and angulation. The logic circuitry of FIG. 5 could be incorporated in the computer 48, with no programming being then required.

The circuitry of FIG. 5, generally designated by reference numeral 115 comprises a gaining and holding circuit 116 having an input connected to the output of the gaining and holding circuit 57 and having a controlled input connected to the output of an amplifier 117 having an input connected to the clock circuit 44 (FIG. 2). The outputs of the gating and holding circuit 57 and the gating and holding circuit 116 are applied to a comparator circuit 118 having outputs connected to inputs of a flip-flop 120. A triggering signal input of the flip-flop 120 is connected to the output of a delay circuit 121 having an input connected to the output of the clock signal amplifier 117. Delay circuit 121 may, for example, be a monostable multivibrator, similar to the monostable multivibrators 89 and 90 and associated timing control resistors and capacitors and is arranged to provide a delay substantially greater than the delay from the clock signal to the front surface reflection signal.

In the operation of the circuit as thus far described, when a clock pulse is applied through amplifier 117 to the control input of the gating and holding circuit 116, the circuit responds to the output of the gating and holding circuit 57 to establish a level at the output of the circuit 116 corresponding to the amplitude of the front surface reflection signal during the previous cycle. Then, during the next time interval $t_{1-t_3}$ (FIG. 3), the gating and holding circuit 57 establishes a new output level corresponding to the amplitude of the new front surface reflection signal. Comparator circuit 118 compares the new level from the output of circuit 57 with the old level at the output of circuit 116 and applies a corresponding signal to set and reset inputs of the flip-flop 120. When a timing signal is then applied from the output of the delay circuit 121 to the timing input of flip-flop 120, flip-flop 120 is placed in a set condition if the new level is higher than the old level or in a reset condition if the new level is lower than the old level.

The reset output of flip-flop 120 is connected to one input of a gate 122 having an output connected to a triggering signal input of a flip-flop 123 and having a second input connected to the output of a delay circuit 124 the input of which is coupled to the output of the delay circuit 121. After a short delay following the application of a timing signal to the flip-flop 120, the delay circuit 124 applies a pulse to one input of gate 122 and if the flip-flop 120 is then in a reset condition, the pulse is applied to the flip-flop 123 to trigger the flip-flop 123 to a state opposite the state it was previously in. If, however, the flip-flop 120 is set, the pulse is not applied through gate 122 to flip-flop 123 and flip-flop 123 remains in the same state as in the previous cycle.

Thus flip-flop 123 is switched to an opposite state if the new level is less than the old level and remains in the old state if the new level is equal to or greater than the old level.

Outputs of the flip-flop 123 are connected to inputs of a pair of gates 125 and 126 having outputs connected to inputs of a pair of gates 127 and 128 and also to inputs of a pair of gates 129 and 130, the outputs of gates 127 and 128 being connected to the gimbal motor control circuit 51 and the outputs of gates 129 and 130 being connected to the swivel motor control circuit 52. Additional inputs of gates 127 and 128 are connected together into one output of a divider circuit 131 while additional inputs of gates 129 and 130 are connected to a second output of the divider circuit 131, the input of the divider circuit 131 being connected to the output of the clock signal amplifier circuit 117. The divider circuit 131 functions to render the gates 127, 128 and the gates 129, 130 alternately operative at a relatively low frequency, permitting continual adjustment of the gimbal and swivel motors 28 and 29 alternately.

Additional inputs of the gates 125 and 126 are connected together and to the output of a delay circuit 132 having an input coupled to the output of the delay circuit 124. After a short delay following the application of a triggering signal from the output of delay circuit 124 to the gate 122, the delay circuit 132 applies a pulse to the inputs of both the gates 125 and 126. If, for example, an enabling signal is being applied from divider circuit 131 to the inputs of the gates 127 and 128, the pulse will be applied either through the gates 125 and 127 to one input of the gimbal motor control circuit 51 or through the gates 126 and 128 to the other input of the gimbal motor control circuit 51, depending upon the state of the flip-flop 123. If the flip-flop 123 is in the same state as in the previous cycle, the pulse will be applied to the same input of the circuit 51 as in the previous cycle. If, however, the flip-flop 123 has been switched to an opposite state in response to a new level lower than the old level, the pulse will be applied to the input of the circuit 51 opposite that to which it was applied in the previous cycle. In response to such pulses, the control circuit 51 operates to step the gimbal motor 28 in a direction to increase the amplitude of the front reflection signal developed during the time interval $t_{2-t_3}$.

Such operation is continued for several clock cycles to effect adjustment of the position of the transducer about the gimbal axis. Then, when the output of the divider 131 is reversed, the gates 129 and 130 are enabled for adjustment of the swivel motor 29 through the control circuit 52 in a similar fashion. Such alternate gimbal and swivel motor adjustments are carried out continually during scanning, to maintain the transducer axis normal to the front surface portion of the part impinged by the ultrasonic beam, permitting optimum scanning of irregularly shaped parts having complex contours.

For adjustment of the spacing between the transducer and the part, the outputs of the gating and holding circuits 56 and 58 are applied to inputs of two comparator circuits 135 and 136 having second inputs connected to the adjustable contacts of a pair of potentiometers 137 and 138 connected between ground and power supply terminals 139 and 140. The outputs of comparator circuits 135 and 136 are connected through relays 141 and 142 to power supply terminals 143 and 144, contacts 145 and 146 being connected between power supply terminals 147 and 148 and lines 149 and 150. Three additional relays 151, 152 and 153 are provided having contacts 154, 155 and 156 connected between line 149 and inputs of the motor control circuits 53, 54 and 55 and having contacts 157, 158 and 159 connected between line 150 and additional inputs of the motor control circuits 53, 54 and 55. The relays 151, 152 and 153 are connected to ground and through switches 161, 162 and 163 to a power supply terminal 164.

In operation, one or more of the switches 161, 162 and 163 is closed depending upon the nature of the scanning operation. If, for example, a part such as the part 12 is being scanned in the manner as illustrated in FIG. 1, the switch 161 is closed to energize the relay 151 and to permit application of control signals through contacts 154 and 157 to the control circuit 53 for the y motor 30. Comparator circuits 135 and 136 compare the outputs of the gating and holding circuits 56 and 58 with reference voltage levels established by the potentiometers 137 and 138 and if the outputs of one of the gating and holding circuits 56 or 58 exceeds the reference voltage level, the corresponding one of the relays 141 or 142 is energized to close one of the contacts 145 or 146 and to cause the motor control circuit to apply a stepping pulse in the proper direction.

For example, in scanning the part 12 as depicted in FIG. 1, with the search tube 11 being moved to the right, first over the horizontal surface 69 and thence over the upwardly inclined surface 70, when the search tube reaches a position over the junction of the right-hand part of the surface 69 and the left-hand part of the inclined surface 70, the front reflection signals will start to occur earlier, during the time interval $t_1-t_2$. The gating and holding circuit 56 then develops an increased output and when it exceeds the reference level established by the potentiometer 137, the comparator circuit 135 energizes the relay 141 to close thee contact 145 and to apply a signal from the power supply terminal 147 through line 149 and the relay contact 154 to one input of the motor control circuit 53 which then steps the y motor 30 in a direction to elevate the search tube. This type of operation is, of course, carried out continually, resulting in a substantially constant spacing between the transducer and the surface portion of the part into which the ultrasonic beam is transmitted.

It is noted that this spacing adjustment operation is important not only in insuring a coupling path of uniform length and in preventing engagement between the transducer and the part, but also in insuring that the front reflection pulse will occur during the gating time of the holding circuit for the automatic angulation adjustment and in insuring that the angulation adjustment will be properly carried out.

It will be understood that modifications and variations may be effected without departing from the the spirit and scope of the novel concepts of this invention.

What is claimed is:

1. In an ultrasonic testing system including transducer means for periodically transmitting bursts of ultrasonic energy toward a front surface of a part and for developing a test signal including a front surface signal from reflection from said front surface and additional signals from reflections from inhomogeneities within the part, scanning means including reversible electric motor means for adjusting the angular position of said transducer means about a predetermined axis, means for supplying a clock signal in synchronized relation to the transmission of a burst from said transducer means, and angular adjustment means responsive to said front surface signal for controlling said reversible electric motor means to rotate said transducer means about a predetermined axis to increase the amplitude of said front surface signal toward a maximum value, said angular adjustment means comprising gating means, means responsive to said clock signal for operating said gating means for a time interval starting at a time before said front surface signal and ending at a time after said front surface signal, and means for applying said test signal to said gating means.

2. In a system as defined in claim 1, said scanning means including second reversible electric motor means for adjusting the angular position of said transducer means about a second predetermined axis generally transverse to said first predetermined axis, and second angular adjustment means responsive to said front surface signal for controlling said second reversible electric motor means to rotate said transducer means about said second predetermined axis to increase the amplitude of said front surface signal toward a maximum value.

3. In a system as defined in claim 2, means for alternately operating the first angular adjustment means and said second angular adjustment means.

4. In a system as defined in claim 1, said angular adjustment means comprising means for energizing said motor means in an arbitrarily determined direction, means for continuing energization of said motor means in said direction when the amplitude of a front surface signal is greater than the amplitude of a preceding front surface signal, and means for discontinuing energization of said motor means in said direction when the amplitude of a front surface signal is less than the amplitude of that of a preceding front surface signal.

5. In a system as defined in claim 4, means for energizing said motor means in the reverse direction when the amplitude of a front surface signal is less than the amplitude of a preceding front surface signal.

6. In a system as defined in claim 1, holding means associated with said gating means to develop an output signal held at the level of the peak amplitude of a front surface signal applied thereto until application of another front surface signal of a different peak amplitude.

7. In a system as defined in claim 6, second holding means coupled to the output of a first holding means to develop an output signal held at the level of the output of the first holding means until after a new level is established by said first holding means, and comparator means to compare the output levels of said first and second holding means.

8. In a system as defined in claim 7, flip-flop means, means coupled to said comparator means and to said flip-flop means for triggering said flip-flop means to an opposite state when the output level of said first holding means is less than the output of said second holding means, and means coupled to said flip-flop means for controlling the direction of operation of said reversible motor means in accordance with the state of said flip-flop means.

9. In a system as defined in claim 1, said scanning means including means for moving said transducer means in a path in generally parallel relation to said front surface and further including additional reversible electric motor means for moving said transducer means toward and away from said front surface, and spacing adjustment means responsive to said clock signal and said front surface signal for controlling said additional reversible electric motor means to maintain a predetermined spacing between said transducer means and said front surface of the part.

10. In an ultrasonic testing system including transducer means for periodically transmitting bursts of ultrasonic energy toward a front surface of a part and for developing a test signal including a front surface signal from reflections from said front surface and additional signals from reflections from inhomogeneities within the part, scanning means including means for moving said transducer means in a path in generally parallel relation to said front surface and reversible electric motor means for moving said transducer means toward and away from said front surface, means for supplying a clock signal in synchronized relation to the transmission of bursts from said transducer means, and spacing adjustment means responsive to said clock signals and said front surface signal for controlling said reversible electric motor means to maintain a predetermined fixed spacing between said transducer means and said front surface of the part.

11. In a system as defined in claim 10, said spacing adjustment means comprising first and second gating means, means for operating said first gating means for a time interval starting in a first time substantially after transmission of a burst from said transducer means and ending at a second time after said first time, means for operating said second gating means starting at a third time after said second time and ending at a fourth time after said third time, means for supplying said test signal to said first and second gate means, firsst control means responsive to the gating of a front surface signal through said first gate means for energizing said motor means in a first direction to move said transducer means away from said front surface, and second control means responsive to the gating of a front surface signal through said second gating means for energizing said motor in an opposite direction to move said transducer means toward said front surface.

12. In a system as defined in claim 11, first andd second holding means associated with said first and second gating means and each arranged to develop an ouput signal held at the level of the peak amplitude of a pulse applied thereto until application of another pulse of a different peak amplitude thereto.

13. In a system as defined in claim 12, said first control means comprising means for supplying a first reference voltage, and first comparator means for comparing said first reference voltage in the output of said first holding means to develop a first output signal when the output of said first holding means exceeds said first reference voltage, said second control means comprising means for supplying a second reference voltage and second comparator means for comparing said second reference voltage and the output of said second holding means to develop a second means exceeds said second reference voltage, and first and second energizing means for energizing said motor in opposite first and second directions in response to said first and second output signals.

14. In a system as defined in claim 13, said first and second energizing means comprising first and second relays responsive to the outputs of said first and second comparator circuits.

* * * * *

UNITED STATES PATENT OFFICE
CERTIFICATE OF CORRECTION

Patent No. 3,898,838      Dated August 12, 1975

Inventor(s) John J. Connelly

It is certified that error appears in the above-identified patent and that said Letters Patent are hereby corrected as shown below:

After the " . (period) " on line 12, column 1 of the Specification add the following — The Invention herein described was made in the course of or under a contract or subcontract thereunder, (or grant) with the Department of the Army.———.

Signed and Sealed this seventeenth Day of February 1976

[SEAL]

Attest:

RUTH C. MASON
*Attesting Officer*

C. MARSHALL DANN
*Commissioner of Patents and Trademarks*